US006970848B2

(12) United States Patent
Osaka et al.

(10) Patent No.: US 6,970,848 B2
(45) Date of Patent: Nov. 29, 2005

(54) METHOD FOR AUTHENTICATING USERS

(75) Inventors: Yoshimichi Osaka, Obihiro (JP); Toshiyo Sawada, Obihiro (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 09/814,755

(22) Filed: Mar. 23, 2001

(65) Prior Publication Data

US 2002/0042779 A1   Apr. 11, 2002

(30) Foreign Application Priority Data

Oct. 11, 2000   (JP) .............................. 2000-310878

(51) Int. Cl.[7] ............................................ G06F 17/00
(52) U.S. Cl. ......................................... 705/51; 705/50
(58) Field of Search .................... 705/50, 51; 713/200, 713/201; 709/219, 226, 228, 229

(56) References Cited

U.S. PATENT DOCUMENTS

| 6,173,407 | B1 | * | 1/2001 | Yoon et al. ................. 713/201 |
| 6,223,292 | B1 | * | 4/2001 | Dean et al. ................. 713/202 |
| 6,598,077 | B2 | * | 7/2003 | Primak et al. .............. 709/219 |
| 6,728,881 | B1 | * | 4/2004 | Karamchetty ............... 713/186 |

FOREIGN PATENT DOCUMENTS

JP          411282998 A   * 10/1999

OTHER PUBLICATIONS

IBM Technical Disclosure Bulletin; Title Security for Routing based on Link State Algorithm; vol. 39; Mar. 1, 1996.*

* cited by examiner

Primary Examiner—Pierre E. Elisca
(74) Attorney, Agent, or Firm—Staas & Halsey LLP

(57) ABSTRACT

In a method for authenticating a user, when authentication request information including a content identification of a content provided is received from the content provider through a terminal of the user, the user is authenticated based on the authentication request information. Then, authentication result information is sent to the content provider through the terminal.

19 Claims, 11 Drawing Sheets

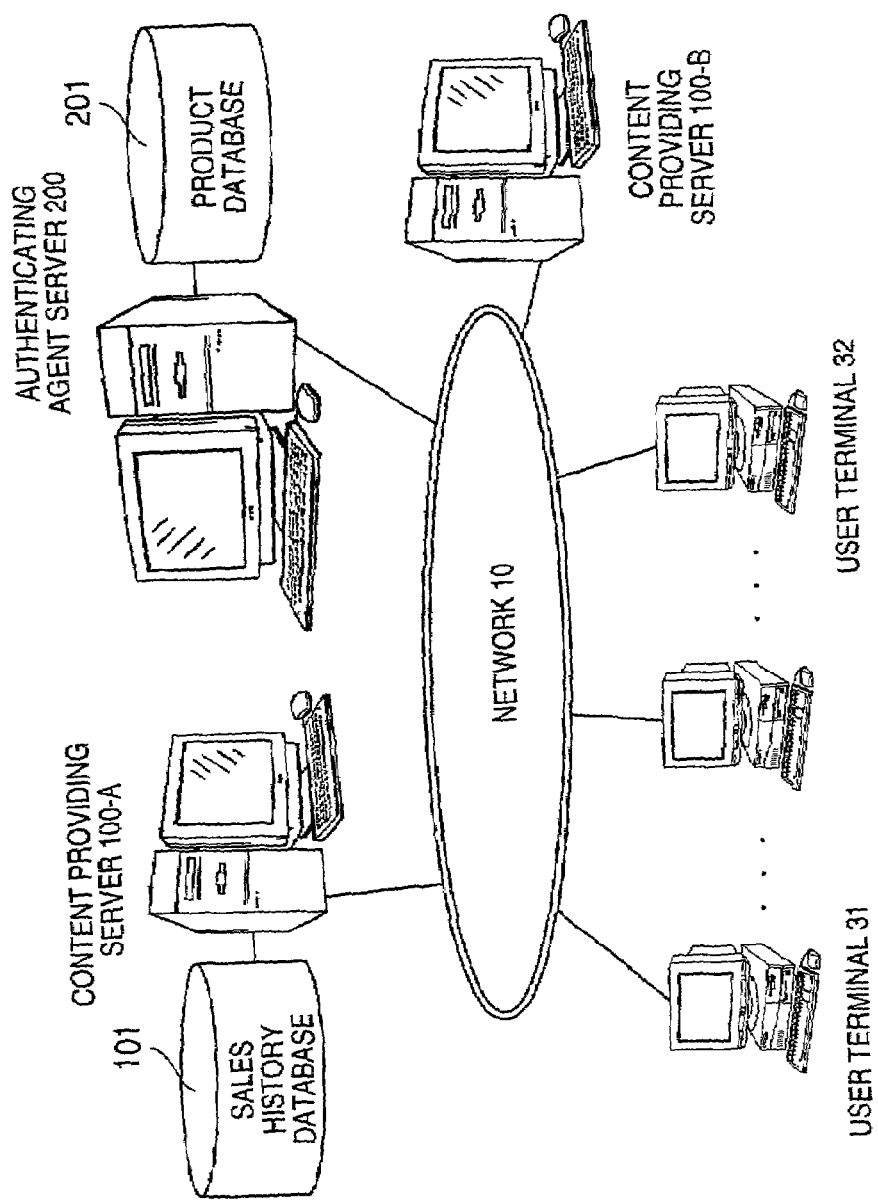

FIG. 9A

| | AUTHENTICATION REQUEST INFORMATION | | | | FALSIFICATION PROTECTION CODE |
|---|---|---|---|---|---|
| | AUTHENTICATION URL GENERATION TIME | PRODUCT IDENTIFICATION | UNIT PRICE | QUANTITY | |
| VALUE | 20000713103659 | AFG-00103 | 03000 | 02 | 1545 |

FIG. 9B

| | AUTHENTICATION URL GENERATION TIME | | | | | | | | | | | | | | PRODUCT IDENTIFICATION | | | | | | | | | UNIT PRICE | | | | | QUANTITY | | TOTAL |
|---|---|---|---|---|---|---|---|---|---|---|---|---|---|---|---|---|---|---|---|---|---|---|---|---|---|---|---|---|---|---|---|
| CHARACTER | 2 | 0 | 0 | 0 | 0 | 7 | 1 | 3 | 1 | 0 | 3 | 6 | 5 | 9 | A | F | G | - | 0 | 0 | 1 | 0 | 3 | 0 | 3 | 0 | 0 | 0 | 0 | 2 | |
| HEX CODE | 32 | 30 | 30 | 30 | 30 | 37 | 31 | 33 | 31 | 30 | 33 | 36 | 35 | 39 | 41 | 46 | 47 | 2d | 30 | 30 | 31 | 30 | 33 | 30 | 33 | 30 | 30 | 30 | 30 | 32 | 609 |
| FALSIFICATION PROTECT CODE | | | | | | | | | | | | | | | | | | | | | | | | | | | | | | | 1545 |

METHOD FOR AUTHENTICATING USERS

BACKGROUND OF THE INVENTION

1. Field of the Invention

The present invention generally relates to provide methods for authenticating a user obtaining information from a content providing server, and more particularly to a method for authenticating a user in which method can conduct an authentication process independent of a content providing server and does not require the content providing server to maintain information concerning a user.

2. Description of the Related Art

When a content providing server provides only members contents, the content providing server checks whether or not the user is a member. When the member is authenticated, the content providing server starts to provide contents to the members.

However, in a case in which the user registers a URL (Uniform Resource Locator) of a content, which is provided after the member is authenticated, to a bookmark of a Web browser, the user can directly access the contents without an authentication even if the membership is expired. Thus, conventionally, the following authentications are conducted.

In order to control access to the contents provided after the user is authenticated, for example, a method for authenticating a user every time as shown in FIG. 1A is provided.

In FIG. 1A, for example, the content providing server conducting product sales sends an authentication form in response to an indication of an intention of purchasing product from a user terminal. And, the content providing server authenticates the user based on input information (account, password, etc.) input into the authentication form by the user and then conducts the product sale to the user when the authentication is successfully completed.

In an alternative method as shown in FIG. 1B, a Web page (one time Web page) generated after the authentication is successfully completed.

In FIG. 1B, the content providing server conducting product sales sends the authentication form in response to the indication of the intention of purchasing products from the user terminal, authenticates the user based on the input information (account, password, etc.) input into the authentication form by the user, generates the one time Web page when the authentication is successfully completed, and conducts the product selling process. In this case, the one time Web page is deleted after one hour. Thus, it is possible to prevent an illegal access, by utilizing the bookmark created by the user, after the authentication is successfully completed.

However, in any one of the above conventional methods, since the content providing server conducts the authentication, the content providing server maintains member information by itself and then has to spend a large amount of expense for a human resources and a physical resources required to maintain.

Therefore, the member information is maintained separately from the content providing server. For example, if it is possible to conduct the authentication process for members by a provider such as an agent conducting a billing process to the members, the content providing server can reduce an amount of work and financial stress and the authentication process is conducted to decide whether or not to provide contents even if the user is registered to the bookmark of the Web browser.

SUMMARY OF THE INVENTION

It is a general object of the present invention to provide a method for authenticating a user in which the above-mentioned problems are eliminated.

A more specific object of the present invention is to provide a method for authenticating a user in which method can conduct an authentication process independent of a content providing server and does not require the content providing server to maintain information concerning a user.

The above objects of the present invention are achieved by a method for authenticating a user who requests to receive information from a content provider, the method including the steps of: (a) receiving authentication request information including a content identification identifying a content provided from the content provider through a terminal of the user; (b) authenticating the user based on the authentication request information received in the step (a); and (c) sending authentication result information where the authentication result in the step (b) is provided, to the content provider through the terminal.

According to the embodiment of the present invention, the authentication result from authenticating the user is additionally provided to the received authentication request information to form the authentication result information and then the authentication result information is sent to the content provider. Therefore, it is possible to eliminate an information management for corresponding the authentication request information to the authentication result.

The above objects of the present invention are achieved by a method for authenticating a user who request to receive information from a content provider, the method including the steps of: (a) receiving authentication result information including an authentication result sent by an authenticator authenticating the user, through a terminal of the user; (b) judging based on the authentication result whether or not the authentication result information is received within a predetermined time from an authentication request time that is included in the authentication result information and shows a time when the authentication request is conducted; and (c) selling a content indicated by the authentication result information to the user based on a judgment result in the step (b).

According to the embodiment of the present invention, since the content provider receives the authentication result information including the authentication result, the content provider is not required to authenticate users by itself. Therefore, it is not required to maintain user information in order to authenticate users. Also, since it is judged based on the authentication request time whether or not the authentication result information is received within the predetermined time, it is possible to simply confirm the validity of the authentication result information. Moreover, it is possible to prevent duplicating sales of the same product to the same authenticated user.

BRIEF DESCRIPTION OF THE DRAWINGS

Other objects, features and advantages of the present invention will become more apparent from the following detailed description when read in conjunction with the accompanying drawings, in which:

FIG. 2 is a diagram showing a network of an authenticating agent system according to the embodiment of the present invention;

FIG. 9A is a diagram showing a data structure of the parameter of the authentication URL according to the embodiment of the present invention and FIG. 9B is a diagram showing the falsification protection code according to the embodiment of the present invention;

DESCRIPTION OF THE PREFERRED EMBODIMENTS

Figure 1A:
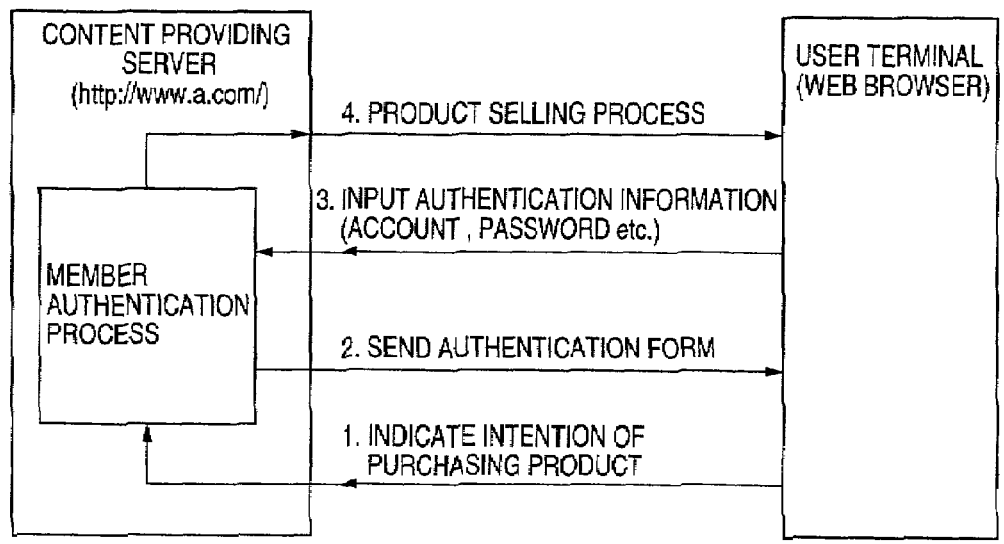
FIG. 1A is a diagram showing a process for authenticating users and FIG. 1B is a diagram showing a one time Web page process for authenticating users.
Figure 1B:
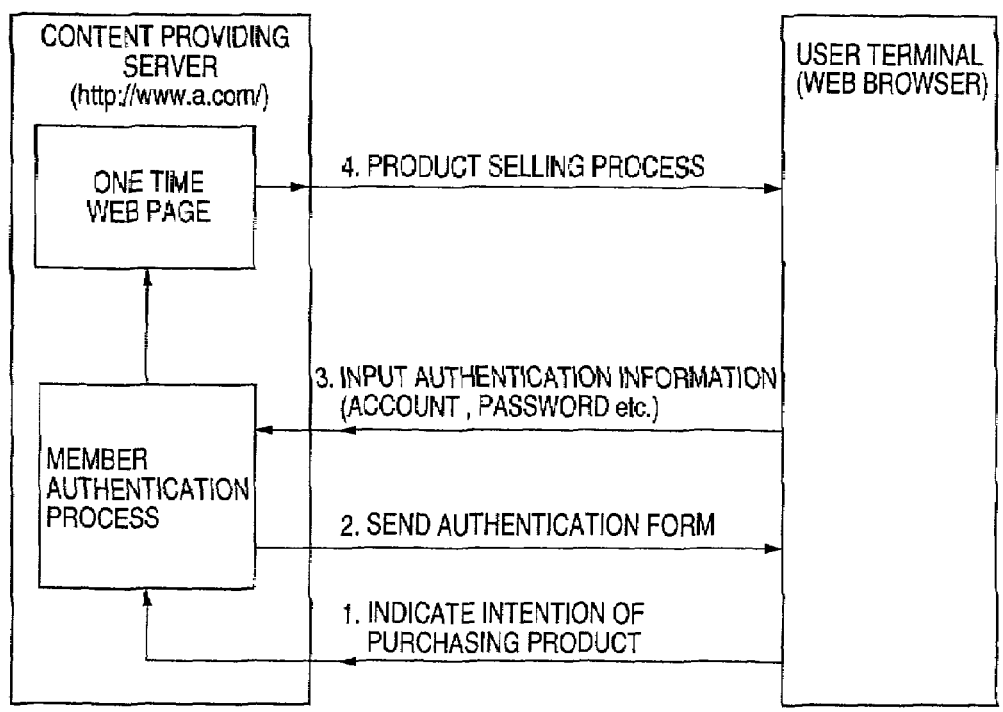

An embodiment according to the present invention will now be described with reference to figures.

A network of an authenticating agent system that a method for authenticating a user according to the embodiment of the present invention is applied to is configured as shown in FIG. 2.

FIG. 2 is a diagram showing the network of the authenticating agent system according to the embodiment of the present invention.

In FIG. 2, a plurality of content providing server 100-A, 100-B . . . , which provide information related to product sales, an authentication agent server 200, which is an agent authenticating users instead of the plurality of content providing server 200, and a plurality of user terminals 31, 32 . . . are connected through a network 10.

For example, referring to FIG. 2, when the user terminal 31 indicates an intention of purchasing a product by accessing the content providing server 100-A, the content providing server 100-A sends an authentication request including information concerning the product indicated by the purchase intention of the user terminal 31, to the authenticating agent server 200 through the user terminal 31. When the authenticating agent server 200 receives the authentication request through the user terminal 31, the authenticating agent server 200 obtains user information from the user terminal 31 and then conducts an authentication process for a user using the user terminal 31.

When the authenticating agent server 200 completes the authentication process, the authenticating agent server 200 obtains a network address of the content providing server 100-A by searching from a product database 201 based on information concerning the product when obtained from the authentication request. Thus, the authenticating agent server 200 notifies the content providing server 100-A providing the product, of an authentication result.

The content providing server 100-A conducts a product selling process for the user using the user terminal 31 based on the authentication result and a sales history maintained in a sales history database 101.

The authenticating agent server 200 also conducts the same authentication process in response to the authentication request of the content providing server 100-B, instead of the content providing server 100-B.

The authenticating agent server 200 receives the authentication request of a content providing server 100 (hereinafter, the plurality of the content providing servers 100-A, 100-B, . . . are called the content providing server 100) through a user terminal 30 (hereinafter, the plurality of user terminal 31, 32, . . . are called the user terminal 30). Then, the authenticating agent server 200 can establish a session in the network to the user terminal 30 to conduct the authentication process for the user of the user terminal 30. Therefore, the content providing server 100 is not required to maintain information concerning users.

Figure 3:
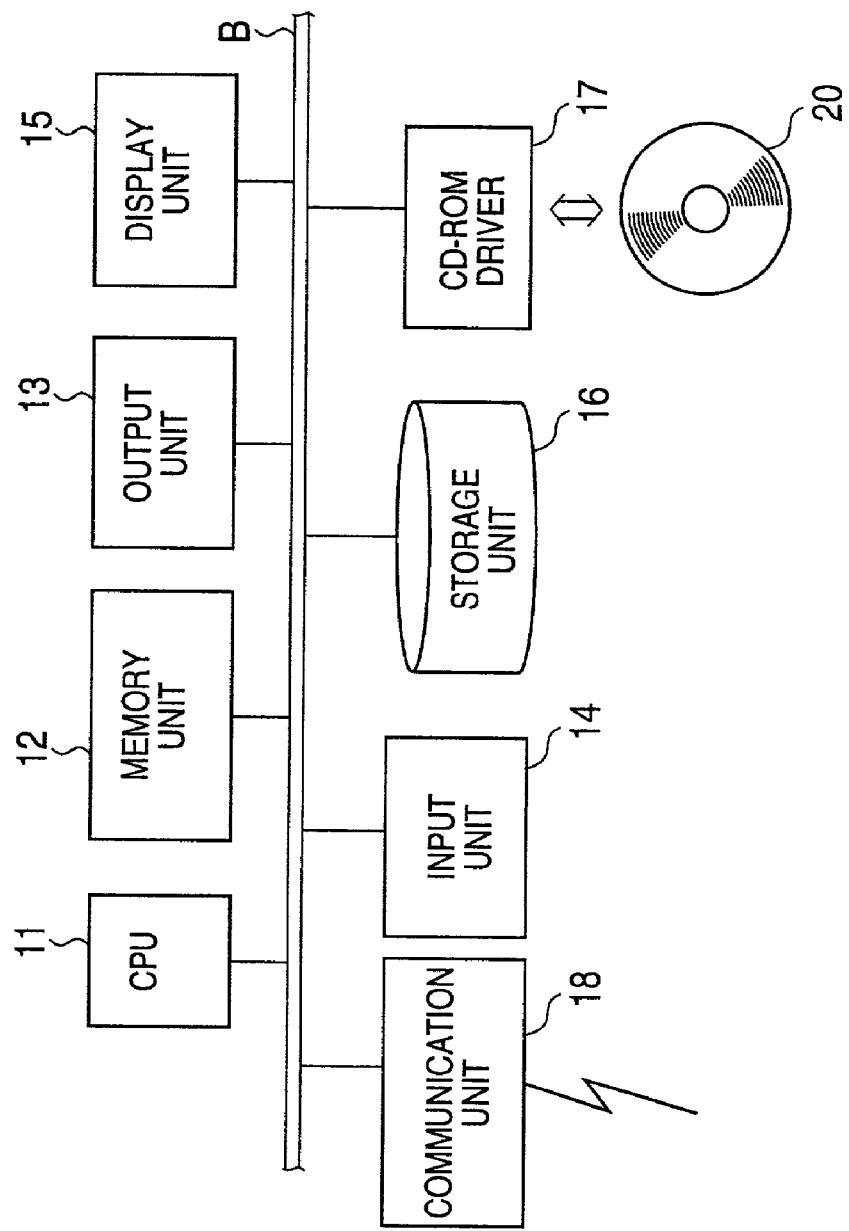
FIG. 3 is a diagram showing a hardware configuration for a computer system as an authenticating agent server according to the embodiment of the present invention.

Hardware of a computer system, in which the authenticating agent server 200 applying the method for authenticating a user according to the embodiment of the present invention, for example, is configured as shown in FIG. 3.

FIG. 3 is a diagram showing the hardware configuration for the computer system as the authenticating agent server 200 according to the embodiment of the present invention.

In FIG. 3, the computer system of the authenticating agent server 200 includes a CPU (Central Processing Unit) 11, a memory unit 12, an output unit 13, an input unit 14, a display unit 15, a storage unit 16, a CD-ROM driver 17 and a communication unit 18, all of which are connected together through a bus B.

The CPU 11 controls the authenticating agent server 200 in accordance with programs stored in the memory unit 12 and also executes processes (described later) in the authenticating agent server 200. The memory unit 12 includes a RAM and a ROM and stores the programs executed by the CPU 11, data necessary for processes and data obtained by the processes. Also, a part of an area of the memory unit 12 is used as a working area for the processes executed by the CPU 11.

The output unit 13 includes a printer or the like and is used to output a process result or indicated information. The input unit 14 includes a mouse, a keyboard or the like and is used to input information necessary for the authentication process by a system manager of the authenticating agent server 200. The display unit 15 displays information for the system manager.

The storage unit 16 includes a hard disk and stores files and the product database 201.

The communication unit 18 controls data transmissions for sending or receiving information between the user terminals 30.

For example, a program of the authentication process conducted in the authenticating agent server 200 is installed into the authenticating agent server 200 by loading a CD-ROM 20 into the CD-ROM driver 17. That is, when the CD-ROM 20 storing the program for managing product information is inserted in the CD-ROM driver 17, the CD-ROM driver 17 reads the program from the CD-ROM 20 and the program read from the CD-ROM 20 is installed into the storage unit 16 via the bus B. When the process is executed, the CPU 11 executes the process in accordance with the program installed into the storage unit 16. It should be noted that a recording medium is not limited to the CD-ROM 20, but another computer-readable recording medium such as a magnetic disk, a magnetic tape, an optical disk, a magneto-optical disk, a semiconductor memory or the like may be used.

Hardware of the content providing server 100 is configured similarly to the above configuration.

The authentication process executed by the CPU 11 will now be described with reference to FIG. 4 through FIG. 11.

With referring to FIG. 4, a whole process flow of the authentication process will now be described with reference to FIG. 5 through FIG. 8.

Figure 4:
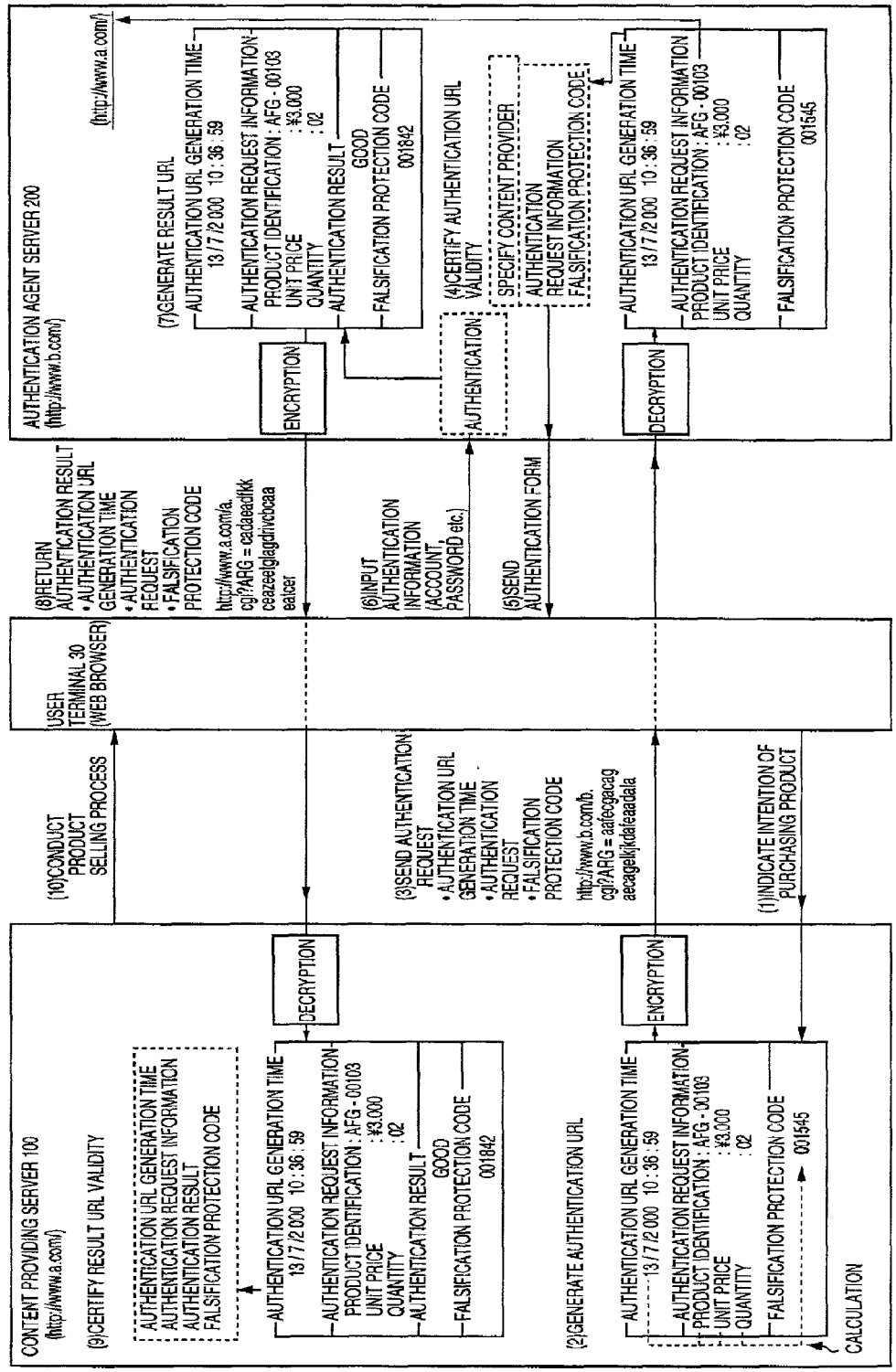
FIG. 4 is a diagram showing a data flow of an authentication process.

FIG. 4 is a diagram showing a data flow of the authentication process.

Figure 8:
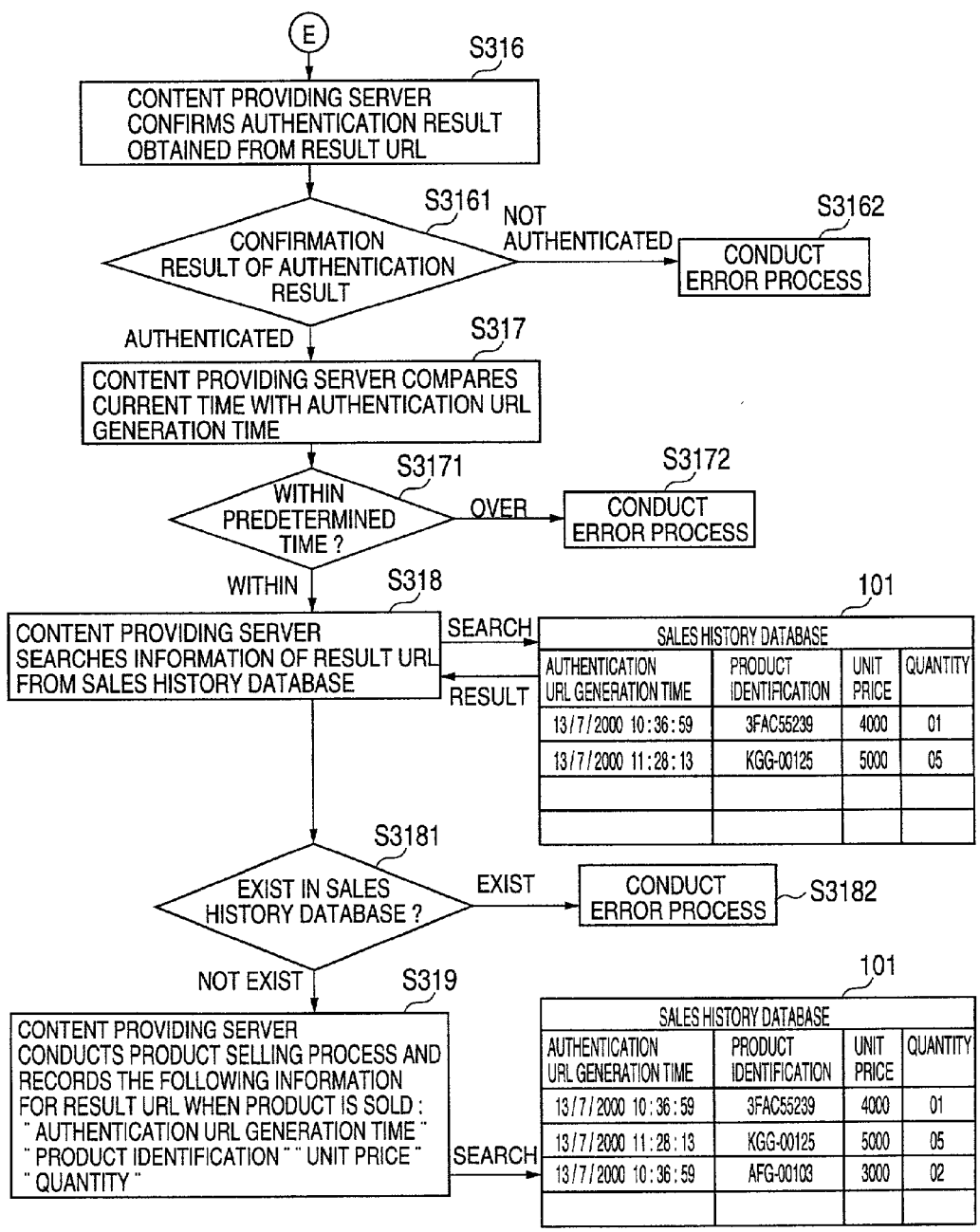
FIG. 8 is a flowchart for explaining the authentication process according to the embodiment of the present invention.

In FIG. 8, for example, it is assumed that a URL (Uniform Resource Locator) of contents provided by the content providing server 100 is "http://www.a.com/" and a URL of the authenticating agent server 200 is "http://www.b.com".

When the user indicates an intention of purchasing product (1) on a Web browser (in FIG. 4), the user terminal 30 sends the indication of intention of purchasing the product from the Web browser to the content providing server 100. For example, when the user selects the product from product information displayed by the content providing server 100 at the Web browser of the user terminal 30 and then clicks a purchase button, the indication of intention of purchasing product (1) is transmitted to the content providing server 100.

The content providing server 100 generates a current time "Jul. 13, 2000 10:36:59" as an authentication URL generation time and authentication request information concerning the purchase product. The authentication request information includes, for example, a product identification "AFG-00103", a unit price "¥3,000", a quantity "02" and a falsification protection code "001545". The content providing server 100 encrypts the authentication request information to obtain an encryption code. Subsequently, the content providing server 100 generates an authentication URL by the encryption code as a parameter of the authentication URL (2).

For example, in the authentication request (3), when the encryption code shows "aafecgacagaecagelkjkdafeaadala", the authentication URL is shown such as a form of "http://www.b.com/b.cgi?ARG=aafecgacagaecagelkjkdafea adala" and then is sent to the authenticating agent server 200.

When the authenticating agent server 200 receives the authentication request (3), the authenticating agent server 200 decrypts the authentication request so as to prove by the falsification protection code that no falsification is detected. Also, the content providing server 100 ("http://www.b-.com"), which provides a product indicated by the product identification "AFG-00103" in the authentication request information, is specified. Therefore, a validity of the authentication URL is certificated (4).

When the validity is certificated, the authentication form is sent from the authenticating agent server 200 to the user terminal 30 (5). Then, in response to the authentication form, authentication information including an account, password and the like input by the user of the user terminal 30 is sent to the authenticating agent server 200 (6).

The authenticating agent server 200 generates the authentication request information including the authentication URL generation time "Jul. 13, 2000 10:36:59", the product identification "AFG-00103", the unit price "¥3,000" and the quantity "02", an authentication result information "GOOD" showing a result of the authentication process, and the falsification protection code "001842" for detecting a falsification, and then encrypts the above generated information to obtain a encryption code. Subsequently, the authenticating agent server 200 generates a result URL with the encryption code as a parameter of the authentication URL (7).

In a case in which for example, the encryption code is "cadaeadfkkceazeetglagdrlvcbcaaeatcer" when an authentication result for the authentication request (3) is returned (8), the result URL such as a form of "http://www.a.com/a.cgi?ARG=cadaeadfkkceazeetglagdrlv cbcaaeatcer" is sent from the authenticating agent server 200 to the content providing server 100 through the user terminal 30.

The content providing server 100 decrypts the returned authentication result (8) so as to prove by the falsification protection code that no falsification is detected and the authentication result is normal. Also, the content providing server 100 compares the authentication URL generation time with a time when the authentication result is returned. The content providing server 100 certificates the validity of the result URL by checking whether or not the authentication result is returned within a valid time (9).

The content providing server 100 conducts a product selling process (10) to the user terminal 30 in response to the validity certification (9) of the result URL.

The authentication process will now be described in detail.

FIG. 5 through FIG. 8 are flowcharts for explaining the authentication process according to the embodiment of the present invention.

Figure 5:
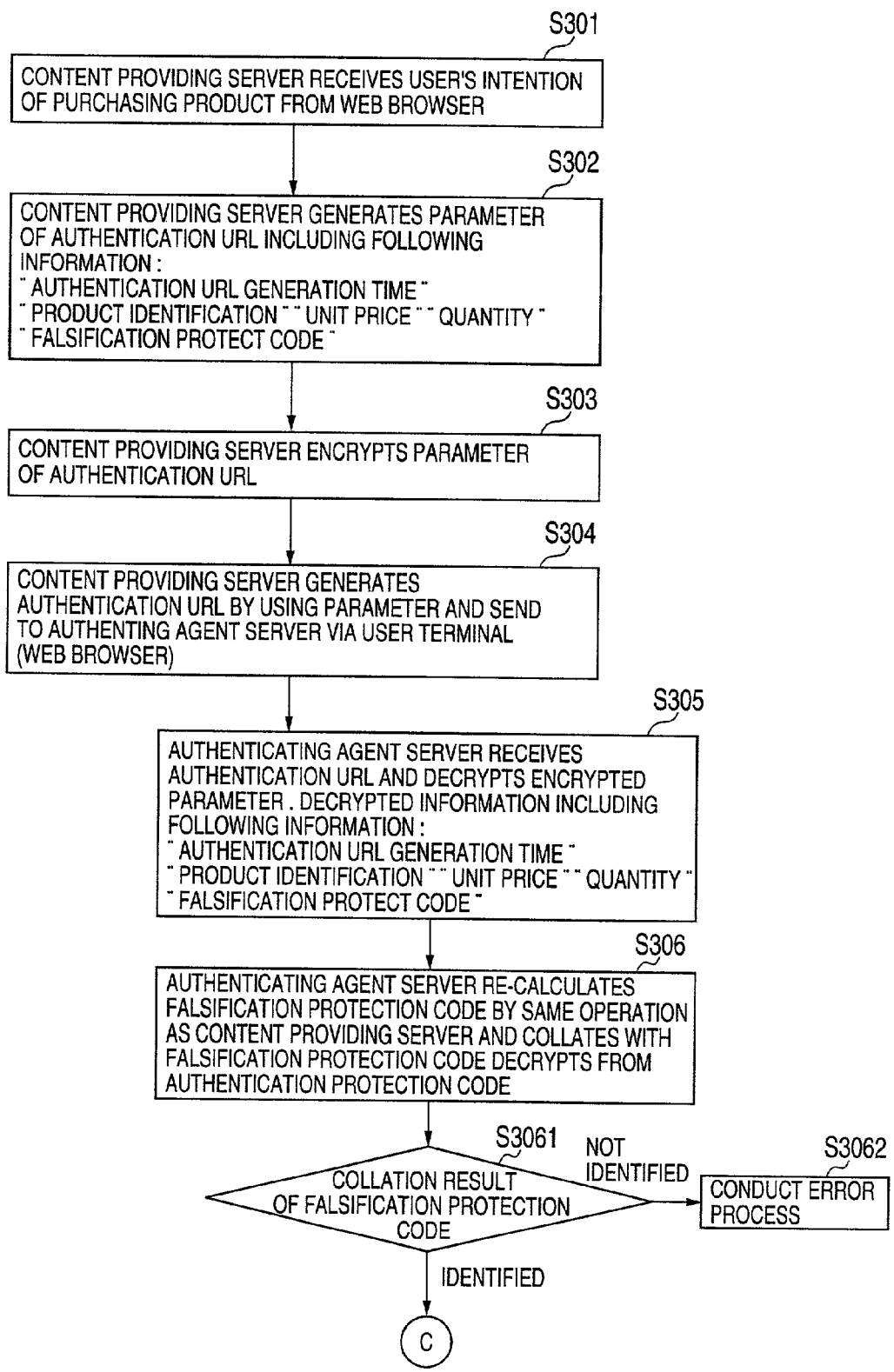
FIG. 5 is a flowchart for explaining the authentication process according to the embodiment of the present invention.

In FIG. 5, the content providing server 100 receives the intention indication of purchasing a product from the user using the Web browser of the user terminal 30 (step S301).

When the content providing server 100 receives the indication of the intention of purchasing the product from the user terminal 30, the content providing server 100 generates a parameter to additionally provide to the authentication URL in order to send the authentication request to the authenticating agent server 200 (step S302).

In the step S302, the content providing server 100 obtains a current time and sets the current time to the authentication URL generation time. And the content providing server 100 sets the product identification, the unit price and the quantity, which are indicated by the indication of the intention of purchasing the product received from the user, so as to form the authentication request information. Also, the content providing server 100 calculates the falsification protection code for detecting a falsification, based on the authentication URL generation time and the authentication request information.

Subsequently, the content providing server 100 encrypts the authentication URL generation time, the authentication request information and the falsification protection code, and then generates a parameter of the authentication URL (step S303).

The content providing server 100 generates an authentication URL by using the encryption data as a parameter of the authentication URL and then sends the authentication URL as an authentication request to the authenticating agent server 200 through the user terminal 30 (step S304). That is, the authentication URL is sent to the Web browser of the user terminal 30 such as a redirect toward the authenticating agent server 200 (for example, a location header of an HTML (Hyper Text Markup Language) or an HTML in which "Refresh" is indicated). Therefore, the Web browser of the user terminal 30 forwards the authentication URL to the authenticating agent server 200.

Processes in steps S305 through S313 are executed by the authenticating agent server 200 and specifies a Web site providing contents.

When the authenticating agent server 200 receives the authentication URL, the authenticating agent server 200 decrypts the encrypted parameter attached to the received authentication URL (the step S305). The decrypted parameter includes the authentication URL generation time, the product identification, the unit price, the quantity and the falsification protection code.

Figure 6:
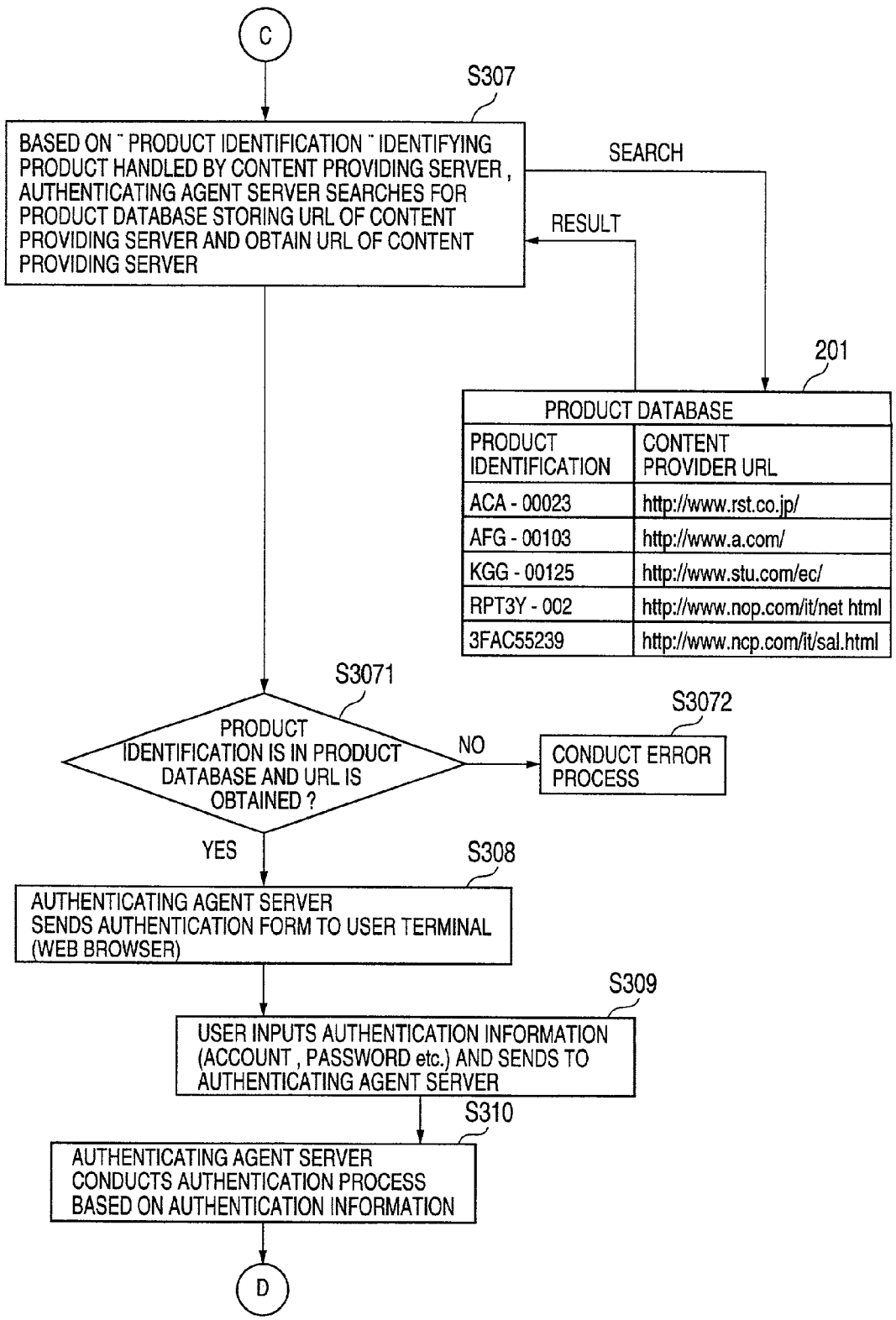
FIG. 6 is a flowchart for explaining the authentication process according to the embodiment of the present invention.

Subsequently, the authenticating agent server 200 re-calculates the falsification protection code by the same operation as the content providing server 100. Then, the authenticating agent server 200 collates the re-calculated falsification protection code with another falsification protection code retrieved from the authentication URL (the step S306) and judges a collation result of the falsification protection code (the step S3061). When it is judged that the collation result of the falsification protection code is not identified, an error process is conducted (step S3062). On the other hand, when it is judged that collation result of the falsification protection code is identified, that is, it shows that data of the authentication URL is not tampered with after the content providing server 100 sent the authentication URL, the step S307 of FIG. 6 is executed.

In the step S307, the authenticating agent server 200 searches the product database 201 storing URLs of a plurality of the content providing servers 100 based on the product identification identifying a product and also one of the plurality of the content providing servers 100, and then obtains the URL of the content providing server 100 specified by the product identification. The product database 201 maintains information by corresponding the product identification identifying the product to a content provider URL showing a URL of the content providing server 100. Thus, the product database 201 can be a text file or a DBMS (Database Management System) in a case where the product identification and the content provider URL are corresponded to each other in the product database 201. The authenticating agent server 200 searches for the content provider URL corresponding to the product identification obtained by decryption from the product database 201 and then obtains the search result.

Based on the search result, it is determined whether or not the product identification, which is decrypted, exists in the product database 201 and the content provider URL is obtained (step S3071). When it is determined that the content provider URL is not obtained (that is, the product identification does not exist or the product identification exists but the content provider URL is not obtained), an error process is conducted (step S3072). On the other hand, when it is determined that the content provider URL is obtained (that is, the product identification exists and the content provider URL corresponding to the product identification is obtained), the step S308 is executed. In this case, for example, the content provider URL "http://www.b.com/" corresponding to the product identification "AFG-00103" is obtained.

Therefore, the validity of the authentication URL is certified by the above steps S306 through S3071.

In step S308, the authenticating agent server 200 sends the authentication form to the Web browser of the user terminal 30.

When the authentication form sent from the authenticating agent server 200 is displayed at the Web browser of the user terminal 30, the user inputs the authentication information including an account and a password identifying the user. The user terminal 30 sends the authentication information input by the user to the authenticating agent server 200 (step S309.

When the authenticating agent server 200 receives the authentication information, the authenticating agent server 200 conducts an authentication process based on the authentication information (step S310). Subsequently, the authenticating agent server 200 executes step S311 of FIG. 7.

Figure 7:
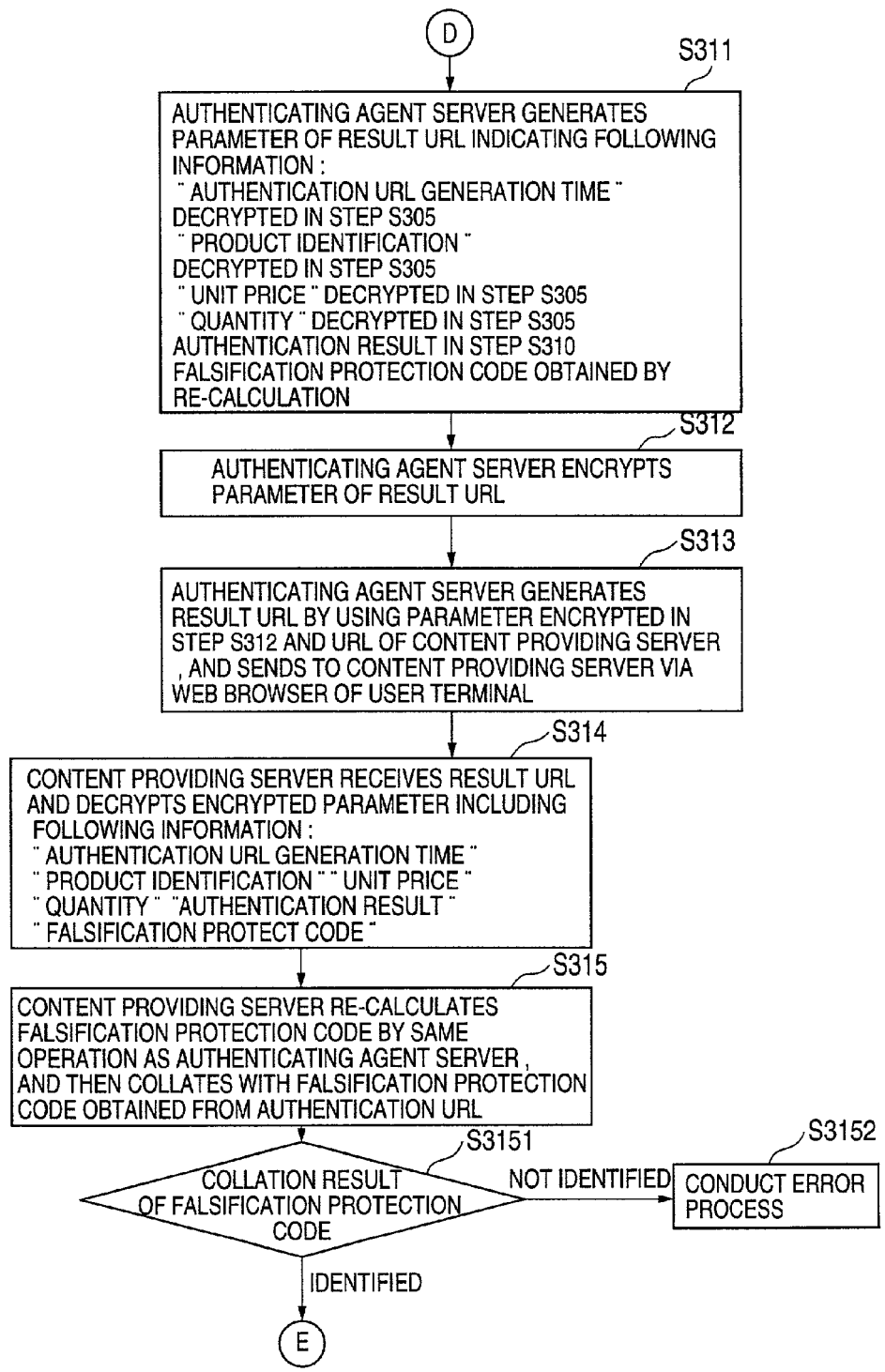
FIG. 7 is a flowchart for explaining the authentication process according to the embodiment of the present invention.

In FIG. 7, the authenticating agent server 200 generates a parameter of the result URL (step S311). That is, the authenticating agent server 200 generates the parameter of the result URL including the authentication URL generation time, the product identification, the unit price and the quantity, which are decrypted in the step S310, the authentication result in the step S310, and the falsification protection code calculated based on the above decrypted information and the authentication result.

Subsequently, the authenticating agent server 200 encrypts the parameter of the result URL (step S312).

Moreover, the authenticating agent server 200 generates the result URL by using the encrypted parameter of the result URL in step S312 and the URL of the content providing server 100 obtained in the step S307, and then sends to the content providing server 100 through the Web browser of the user terminal 30 (step S313). Similarly to the step S304 for the content providing server 100, the result URL is sent to the Web browser to the user terminal 30 as a redirect toward the content providing server 100 (for example, a location header of an HTML or an HTML in which a "Refresh" is indicated) Therefore, the Web browser of the user terminal 30 sends the result URL to the content providing server 100.

The following steps S314 through S319 are executed by the content providing server 100 to protect from duplicating sales of the same product.

When the content providing server 100 receives the result URL, the parameter encrypted in the step S312 is decrypted (step S314). The content providing server 100 obtains the authentication URL generation time, the product identification, the unit price, the quantity, the authentication result and the falsification protection code by decrypting the received result URL.

The content providing server 100 re-calculates the falsification protection code by the same operation as the authenticating agent server 200 based on the authentication URL generation time, the product identification, the unit price, the quantity and the authentication result, which are decrypted in the step S314. Then the content providing server 100 collates the re-calculated falsification protection code with another falsification protection code obtained by decryption (step S315). It is determined whether or not the falsification protection code is identified (step S3151). When it is determined that the falsification protection code is not identified, an error process is conducted (step S3152). On the other hand, when it is determined that the falsification protection code is identified, that is, the result URL is not tampered with before reaching to the content providing server 100 from the authenticating agent server 200 through the user terminal 30, the content providing server 100 executes step S316 of FIG. 8.

In FIG. 8, the content providing server 100 confirms the authentication result obtained by decrypting the result URL (step S316). It is determined whether or not the confirmation result of the authentication result shows that the user is authenticated (step S3161). When it is determined that the user is not authenticated, the error process is conducted (step S3162) When it is determined that the user is authenticated, the content providing server 100 executes step S317.

In step S317, the content providing server 100 compares a current time with the authentication URL generation time obtained by the decryption. It is determined whether or not the current time is within a predetermined time from the authentication URL generation time (step S3171). When it is determined that the current time is not within the predetermined time, the error process is conducted (step S3172). On the other hand, when it is determined that the current time is within the predetermined time, that is, the result URL is returned within a valid time, the content providing server 100 executes step S318.

In step S318, the content providing server 100 searches information corresponding to the result URL from the sales history database 101. The sales history database 101 is used to maintain information of a completed product selling process and for example, may be a text file or a DBMS so as to include the authentication URL generation time, the product identification, the unit price, the quantity and the like.

In accordance with the result of step S318, the content providing server 100 determines whether or not information concerning the result URL exists in the sales history database 101 (step S3181). When the information concerning the result URL exists in the sales history database 101, the error process is conducted (step S3182). On the other hand, when the information concerning the result URL does not yet exist in the sales history database 101, the content providing server 100 executes step S319.

Therefore, by the determination of the step S3181, it is possible to prevent duplicating the product selling process for the same product when the result URL showing that the user is authenticated is sent again to the content providing server 100 by accident. Therefore, the validity of the result URL is confirmed.

In step S319, the content providing server 100 executes the product selling process. That is, the content providing server conducts the product selling process for the product indicated by the intention of purchasing the product based on the product identification, the unit price and quantity, which are decrypted in step S314, and also stores the authentication URL generation time, the product identification, the unit price and the quantity to record that the product selling process is conducted.

In the above steps S314 through S319 which are executed by the content providing server 100 to prevent from duplicating the product selling process for the same product, the authentication URL generation time is used as a time to judge whether or not the product selling process is conducted within the valid time and also is used as an identification to identify which authentication URL for the product selling process.

For example, the sales history database 101 may store decrypted information, encrypted information, or a mixture of encrypted information for secret information and decrypted information.

FIG. 9A is a diagram showing a data structure of a parameter of the authentication URL according to the embodiment of the present invention.

As described above, the parameter of the authentication URL includes the authentication request information including the authentication URL generation time showing seconds, minutes, hour, date, month and year, the product identification identifying a product, the unit price and quantity, and the falsification protection code, as shown in FIG. 9A.

FIG. 9B is a diagram showing the falsification protection code according to the embodiment of the present invention.

In FIG. 9B, the authentication URL generation time, the product identification, the unit price and the quantity are shown as characters and a hex code for each character is shown on the bottom row of the diagram. For example, a value, in which a total hex value is converted into a decimal value, is defined as the falsification protection code. In this case, the total hex value is "60". A value "1545" is converted from the total hex value to a decimal value, is defined as the falsification protection code, and then forms the parameter of the authentication URL.

As described above, the whole value for the parameter of the authentication URL shown in FIG. 9A is encrypted by the content providing server 100.

In addition, a data structure of the parameter of the result URL notifying the authentication result is formed by additionally providing the authentication result to the parameter of the authentication URL in FIG. 9A. In this case, the falsification protection code can be calculated by the same operation shown in FIG. 9A based on the authentication request information including the authentication URL generation time, the product identification, the unit price and the quantity, and the authentication result.

As described above, the whole value of the parameter of the result URL is encrypted by the authenticating agent server 200.

Figure 10:
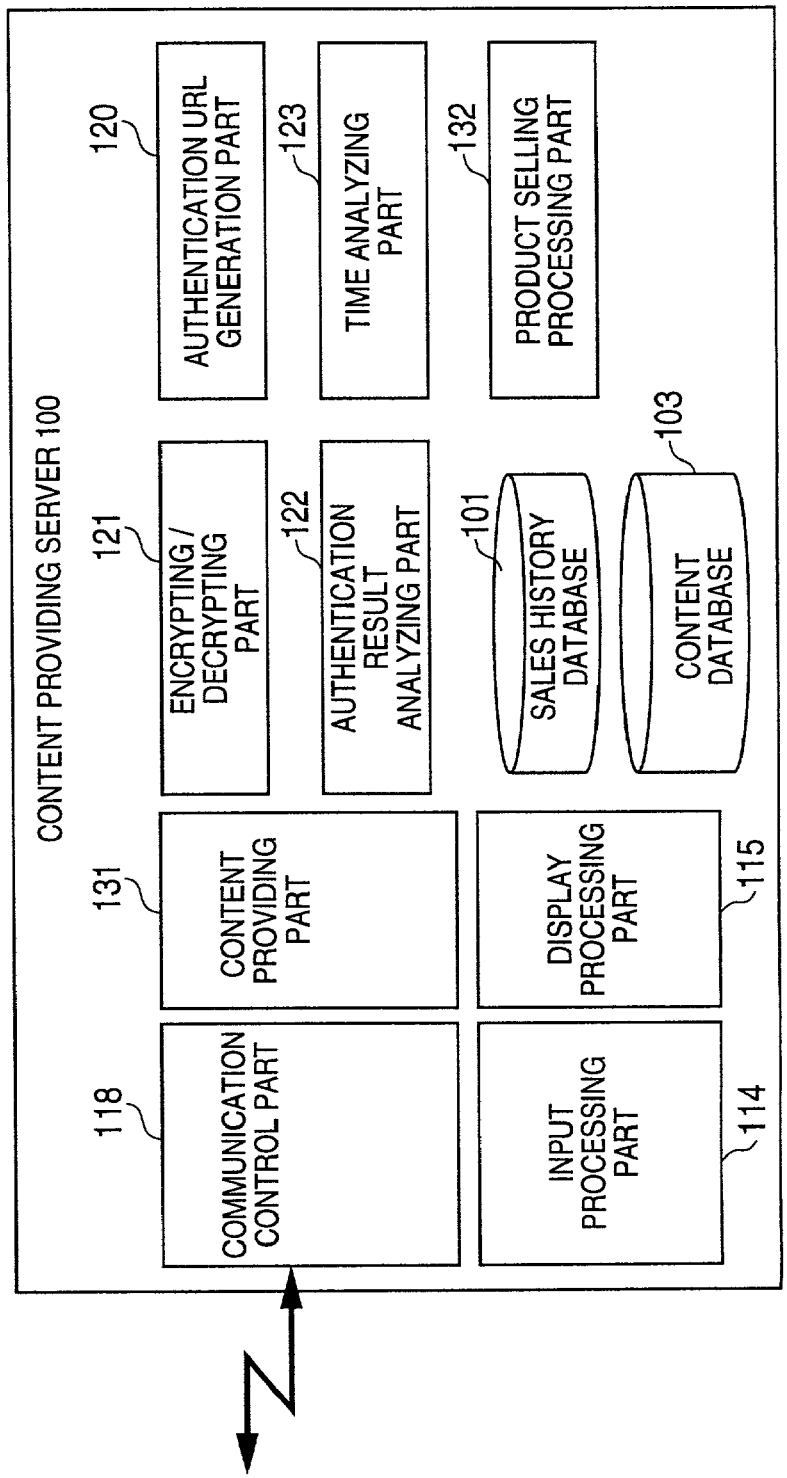
FIG. 10 is a diagram showing a functional configuration of the content providing server according to the embodiment of the present invention.

For example, the above processes in the content providing server 100 can be realized by a functional configuration shown in FIG. 10.

FIG. 10 is a diagram showing the functional configuration of the content providing server 100 according to the embodiment of the present invention.

In FIG. 10, the content providing server 100 includes a communication control part 118, an input processing part 114, a display processing part 115, an authentication URL generating part 120, encrypting/decrypting part 121, an authentication result analyzing part 122, a time analyzing part 123, a content providing part 131, a product selling processing part 132, the sales history database 101, the content providing database 103. The sales history database 101 and the content providing database 103 are stored in the storage unit 16 in FIG. 3.

The input processing part 114 processes data input from the input unit 14 in FIG. 3.

The display processing part 115 processes data to display at the display unit 15 in FIG. 3.

The communication control part 118 controls the communication unit 16 in FIG. 3 to receive and send data.

The content providing part 131 provides users product information maintained in the content database 103, for example, in a HTML form by the communication control part 118.

When the authentication URL generating part 120 receives an indication of intention of purchasing a product, the authentication URL generating part 120 generates the authentication URL based on the authentication URL generation time where a current time id set, the authentication request information including the product information corresponding to the indication of the intention of purchasing the product, and the falsification protection code calculated from the authentication URL generation time and the authentication request information. In addition, the authentication URL generating part 120 activates the encrypting/decrypting part 121 to encrypt the generated authentication URL and conducts the authentication request by using an URL of the authenticating agent server 200, which URL embodies the encrypted authentication URL.

When the authentication result is returned, the authentication result analyzing part 122 activates the encrypting/decrypting part 121 to decrypt the result URL. And then, the authentication result analyzing part 122 confirms the validity of the result URL by an analysis result, in which the time analyzing part 123 analyzes the result URL generation time of the decrypted result URL.

The time analyzing part 123 compares the authentication URL generation time with a current time and then judges whether or not the authentication result is returned within the predetermined time.

The product selling processing part 132 searches for the authentication request information of the result URL from the sales history database 101 based on the analysis result in which the authentication result analyzing part 122 analyzes the validity of the result URL. Then, the product selling processing part 132 confirms that there are no duplicated sales of the same product for the same user. Based on the confirmation result, the product selling processing part 132 stores the authentication information as a sales history and conducts the product selling process to sell the product to the user.

Figure 11:
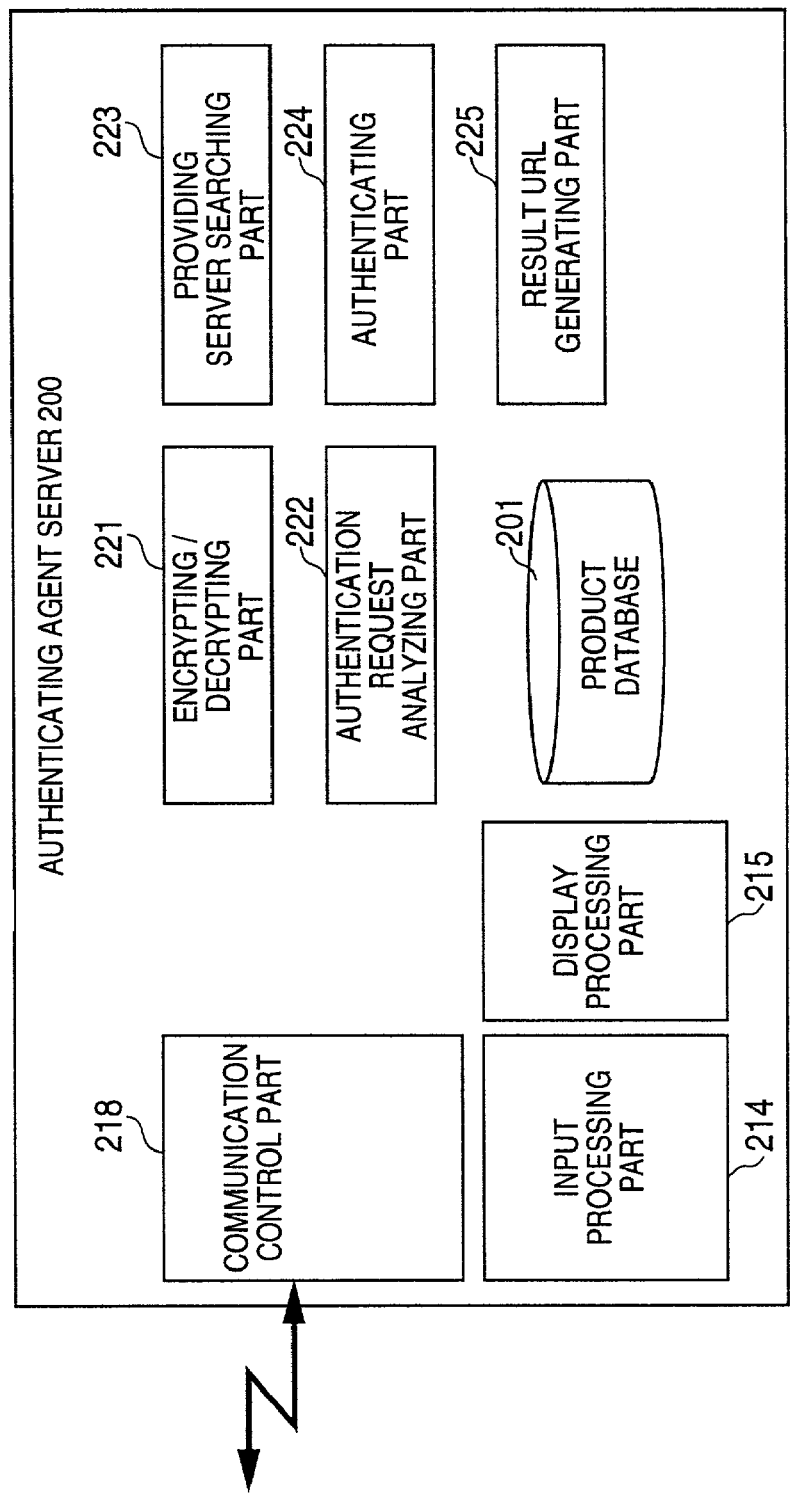
FIG. 11 is a diagram showing a functional configuration of the authenticating agent server according to the embodiment of the present invention.

The authentication process conducted by the authenticating agent server 200 can be realized by a functional configuration shown in FIG. 11.

FIG. 11 is a diagram showing the functional configuration of the authenticating agent server 200 according to the embodiment of the present invention.

In FIG. 11, the authenticating agent server 200 includes a communication control part 218, an input processing part 214, a display processing 215, an encrypting/decrypting part 221, an authentication request analyzing part 222, a providing server searching part 223, an authenticating part 224, a result URL generating part 225 and the product database 201.

The input processing part 214 processes data input from the input unit 14 in FIG. 3.

The display processing part 215 processes data to display at the display unit 15 in FIG. 3.

The communication control part 218 controls the communication unit 18 in FIG. 3 to receive and send data.

When the authentication request analyzing part 222 receives the authentication request, the authentication request analyzing part 222 activates the encrypting/decrypting part 221 to decrypt the authentication URL. And, the authentication request analyzing part 222 confirms the validity of the authentication URL by a search result of the providing server searching part 223 and the falsification protection code based on the authentication request information of the decrypted authentication URL.

The authenticating part 224 authenticates the user based on the authentication information received from the user.

The providing server searching part 223 searches for the product information included in the authentication request information from the product database 201 and then obtains the URL of the content providing server 100 corresponding to the product information.

The result URL generating part 225 generates the result URL based on the authentication URL generation time, the authentication request information, the authentication result obtained by the authenticating part 224, and the falsification protection code calculated from the authentication URL generation time, the authentication request information, the authentication result. Also, the result URL generating part 225 activates the encrypting/decrypting part 221 to encrypt the generated result URL and then returns the authentication result by using the URL of the content providing server 100 in the form embodying the encrypted result URL.

In the embodiment, the authentication request information, which includes the information concerning the product indicated by the user's intention of purchasing the product, is encrypted and then the encrypted authentication request information is additionally provided as the parameter of the authentication URL of the authenticating agent server 200. Therefore, the content providing server 100 is not required to maintain the information concerning the product until the authenticating agent server 200 completes to authenticate the user.

Also, since the authentication request is sent to the authenticating agent server 200 via the user terminal 30, the authenticating agent server 200 can identify the user terminal 30 because of the session in a network connection to the user terminal 30. Therefore, it is not required for the content providing server 100 to maintain the information concerning the user terminal 30, which sent the indication of intention of the purchasing the product, in order to authenticate the user.

In addition, in this embodiment, since it is possible to identify the content providing server 100 by the product identification included in the authentication request, it is not required for the authenticating agent server 200 to include information identifying the content providing server 100 into the authentication request. Therefore, even if the authentication request is tampered with, it is difficult to specify the content providing server 100 from the authentication request information and then it is possible to improve the secret protection.

Moreover, the content providing server 100 can determine, by encrypting the authentication result returned from the authenticating agent server 200, whether or not a falsification is conducted. Also, the content providing server 100 compares the authentication URL generation time included in the authentication result, which time is included in the authentication request when the authentication request is generated, with the current time and then determines whether or not the authentication result is returned within the predetermined time. Therefore, the content providing server 100 can confirm the validity of the authentication result and prevent from duplicating sales of the same product for the same user. Furthermore, the authentication URL generation time is defined by the content providing server 100. Therefore, the above comparison is not affected by each machine time of the user terminal 30 and the authenticating agent server 200 during the authentication process.

As described above, according to the present invention, it is possible for the content providing server 100 to reduce an overload of the authentication process for the user, and it is possible to prevent from duplicating sales of the product.

Also, in the embodiment, the contents, which are provided by the content providing server 100, can be products including information, music, graphics, manufactured products or the like.

The present invention is not limited to the specifically disclosed embodiments, variations and modifications, and other variations and modifications may be made without departing from the scope of the present invention.

The present application is based on Japanese Priority Application No. 2000-310878 filed on Oct. 11, 2000, the entire contents of which are hereby incorporated by reference.

What is claimed is:

1. A method for authenticating users who use respective client terminals to independently issue requests of the users to receive information from a content provider that in response provides requested content to the user terminals, said method comprising:
   at an authenticator server other than the content provider, receiving, via a network, authentication request information including a content identification identifying a content requested by a user using the user's client terminal, where the authentication request information is sent via the network from said content provider and automatically passes through a user's user client terminal to the authenticator server, where the user's client terminal is a type configured to be used by the user to access content providers via the network;
   at the authenticator server, via the network, sending an authentication input form to the user's client terminal and receiving from the user terminal authentication information that was input into the form by the user at the user's client terminal;
   at the authenticator server, generating authentication result information by authenticating the user by matching the authentication information with predetermined authentication information of the user, where the generating is responsive to receiving the authentication request information sent from the client terminal of the user; and
   sending, via the network, the generated authentication result information from the authenticator to the terminal, where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider.

2. The method as claimed in claim 1, further comprising searching for the content provider corresponding to the content identification included in the authentication request information from a content provider table in which table the content identification is corresponded to specification information specifying the content provider, wherein the sent authentication result information is based on a result of the searching.

3. The method as claimed in claim 2, wherein said sending the generated authentication result further comprises:
   generating a provider address including the authentication result information based on the specification information; and
   sending the terminal forward information defining the generated provider address as a forward address,
   wherein the authentication result information is sent to the terminal where it is redirected to the content provider by the terminal using the forward information.

4. A method for authenticating a user who requests to receive information from a content provider, said method comprising:
   at an authenticator other than the content provider, receiving via a network authentication request information including a content identification identifying a content, where the authentication request information is sent via the network from said content provider through a terminal of the user to the authenticator, where the terminal is a type configured to be used by the user to access content providers via the network;
   at the authenticator, via the network directly sending an authentication form to the terminal and directly receiving authentication information from the user terminal input by the user with the form;
   at the authenticator, generating authentication result information by authenticating the user based on the authentication information responsive to the authentication request information sent from the content provider and through the terminal of the user;
   sending via the network the generated authentication result information from the authenticator to the terminal where it is redirected from the terminal to said content provider via the network; and
   searching for the content provider corresponding to the content identification included in the authentication request information from a content provider table in which table the content identification is corresponded to specification information specifying the content provider, wherein the sent authentication result information is based on a result of the searching,
   wherein said generating authentication result information comprises:
   obtaining first falsification protection information, which is included in the authentication request information, for detecting a falsification by decrypting the authentication request information;
   generating a second falsification protection information based on the authentication request information other than the first falsification protection information; and
   judging whether or not the first falsification protection information identifies with the second falsification protection information, and
   wherein said searching for the content provider is enabled based on a result of the judging.

5. A method for authenticating a user who requests to receive information from a content provider, said method comprising:
   at an authenticator other than the content provider, receiving via a network authentication readiest information including a content identification identifying a content, where the authentication readiest information is sent via the network from said content provider through a terminal of the user to the authenticator, where the terminal is a the configured to be used by the user to access content providers via the network;
   at the authenticator, via the network directly sending an authentication form to the terminal and directly receiving authentication information from the user terminal input by the user with the form;
   at the authenticator, generating authentication result information by authenticating the user based on the authentication information responsive to the authentication request information sent from the content provider and through the terminal of the user;
   sending via the network the generated authentication result information from the authenticator to the terminal where it is redirected from the terminal to said content provider via the network; and
   searching for the content provider corresponding to the content identification included in the authentication readiest information from a content provider table in which table the content identification is corresponded to specification information specifying the content provider, wherein the sent authentication result information is based on a result of the searching wherein said sending the generated authentication result further comprises:
generating a provider address including the authentication result information based on the specification information; and
sending the terminal forward information defining the generated provider address as a forward address,
wherein the authentication result information is sent to the terminal where it is redirected to the content provider by the terminal using the forward information,
wherein said sending the generated authentication information further comprises:
generating a third falsification protection information for detecting a falsification based on the authentication result information; and
obtaining encrypted data by encrypting the third falsification protection information and the authentication result information, and
wherein the generated provider address includes the encrypted data.

6. A method for authenticating a user who requests to receive information from a content provider, said method comprising:
receiving via a network authentication result information including an authentication result and content information concerning a content that the user desired, which are sent via the network from an authenticator authenticating the user to a terminal of the user and redirected from the terminal to said content provider where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider;
judging based on the authentication result whether or not the authentication result information is received within a predetermined time from an authentication request time that is included in an authentication result information and shows a time when the authentication request is conducted; and
selling via the network a content indicated by the content information of the authentication result information to the user based on a result of the judging.

7. A method for authenticating a user who requests to receive information from a content provider, said method comprising:
receiving via a network authentication result information including an authentication result and content information concerning a content that the user desired, which are sent via the network from an authenticator authenticating the user to a terminal of the user and redirected from the terminal to said content provider;
judging based on the authentication result whether or not the authentication result information is received within a predetermined time from an authentication request time that is included in an authentication result information and shows a time when the authentication readiest is conducted;
selling via the network a content indicated by the content information of the authentication result information to the user based on a result of the judging;
generating authentication request information including the content information and the authentication request time in that a current time is defined as the time when the authentication request is conducted, based on purchase information for purchasing a content which information is received from the terminal of the user;
generating an authentication address of the authenticator as a form including the generated authentication request information; and
sending forward information defining the authentication address as a forward address, to the terminal, and
wherein the authentication request information is forwarded to the authenticator through the terminal of the user.

8. The method as claimed in claim 7, further comprising:
generating a third falsification protection information for detecting a falsification based on the authentication request information; and
obtaining encrypted data by encrypting the third falsification protection information and the authentication request information,
wherein said generating authentication request information generates the authentication address including the encrypted data.

9. A method for authenticating a user who requests to receive information from a content provider, said method comprising:
receiving via a network authentication result information including an authentication result and content information concerning a content that the user desired, which are sent via the network from an authenticator authenticating the user to a terminal of the user and redirected from the terminal to said content provider;
judging based on the authentication result whether or not the authentication result information is received within a predetermined time from an authentication request time that is included in an authentication result information and shows a time when the authentication request is conducted;
selling via the network a content indicated by the content information of the authentication result information to the user based on a result of the judging;
obtaining a first falsification protection information for detecting a falsification, which information is included in the authentication result information, by decrypting the authentication result information;
generating a second falsification protection information based on the authentication result information other than the first falsification protection information; and
judging whether or not the first falsification protection information is identified with the second falsification protection, and
wherein said judging whether or not the authentication result information is received within a predetermined time is enabled based on a result of the judging the first falsification protection information.

10. A computer-readable recording medium recorded with a program for causing a computer to perform a process to authenticate a user who requests to receive information from a content provider, said process comprising:
at an authenticator other than the content provider, receiving via a network authentication request information including a content identification identifying a content provided from said content provider through a terminal of the user to the authenticator, where the terminal is a type configured to be used by the user to access content providers via the network;
at the authenticator, via the network directly sending an authentication form to the terminal and directly receiving authentication information from the user terminal input by the user with the form;

at the authenticator, authenticating the user based on the authentication information responsive to the received authentication request information; and sending via the network authentication result information of the authenticating, where authentication result is sent from the authenticator to the terminal where it is redirected from the terminal, to said content provider via the network where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider.

11. The computer-readable recording medium as claimed in claim 10, said program further comprising the searching for the content provider corresponding to the content identification included in the authentication request information from a content provider table in which table the content identification is corresponded to specification information specifying the content provider, wherein said sending the authentication result information is based on a search result of the searching.

12. The computer-readable recording medium as claimed in claim 10, wherein said sending authentication result information comprises:

generating a provider address including the authentication result information based on the specification information searched; and sending the terminal forward information defining the generated provider address as a forward address, wherein the authentication result information is sent to the content provider through the terminal.

13. A computer-readable recording medium recorded with a program for causing a computer to perform or process to authenticate a user who requests to receive information from a content provider, said process comprising:

receiving via a network authentication result information including an authentication result and content information concerning a content that the user desired, which are sent via the network from an authenticator authenticating the user to a terminal of the user and redirected from the terminal to said content provider where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider;

judging based on the authentication result whether or not the authentication result information is received within a predetermined time from an authentication request time that is included in the authentication result information and shows a time when the authentication request is conducted; and selling via the network a content indicated by the authentication result information to the user based on a result of the judging.

14. The computer-readable recording medium as claimed in claim 10, said program further comprising:

generating authentication request information including the content information and the authentication request time in that a current time is defined as the time when the authentication request is conducted, based on purchase information for purchasing a content which information is received from the terminal of the user;

generating an authentication address of the authenticator as a form including the generated authentication request information; and sending forward information defining the authentication address as a forward address, to the terminal, wherein the authentication request information is forwarded to the authenticator through the terminal of the user.

15. An authenticating apparatus for authenticating a user who requests to receive information from a content provider, said apparatus comprising:

a receiving part receiving via a network authentication request information including a content identification identifying a content, where the authentication request information is sent via the network from said content provider through a terminal of the user to the authenticating apparatus;

an authentication information receiving part via the network directly sending an authentication form to the terminal and directly receiving authentication information from the user terminal input by the user with the form;

an authenticating part authenticating the user by generating authentication result information based the authentication information responsive to the authentication request information sent from the content provider and through the terminal of the user; and an authentication result sending part sending the generated authentication result information from the authenticating apparatus, to the terminal where it is redirected from the terminal to said content provider where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider.

16. An apparatus for authenticating a user who requests to receive information from a content provider, said apparatus comprising:

a receiving part receiving authentication result information including an authentication result and content information concerning a content that the user desired, which are sent via a network from an authenticator authenticating the user to a terminal of the user and redirected from the terminal to said content provider where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider;

a judging part judging based on the authentication result whether or not the authentication result information is received via the network within a predetermined time from an authentication request time that is included in the authentication result information and shows a time when the authentication request is conducted; and a selling part selling via the network a content indicated by the content information of the authentication result information to the user based on a result of the judging.

17. A method of authentication on a network performed by an authenticating agent, the method comprising:

at the authentication agent, receiving via the network an authentication request;

at the authentication agent, responding to the authentication request by sending an authentication form via the network directly from the authentication agent to a user's client or browser that caused the authentication request to be received by the authentication agent;

at the authentication agent, responding to receiving directly via the network from the client or browser an interactive response inputted by the user to the authentication form by authenticating the user corresponding to the interactive response based on the interactive response; and in accordance with the authenticating of the user, sending an authentication response via the network from the authentication agent to the browser or client, where the authentication response contains information that if received by the browser or client would cause the client or browser to forward or redirect the authentication response to a web server that sent the authentication request where the authentication result is accompanied by a redirect indicator, where the user terminal receives the redirect indicator with the authentication result and in response automatically redirects the authentication result from the terminal to said content provider via the network, whereby the authentication result issues from the authenticator server and automatically passes through the user terminal to the content provider.

18. A method of authentication, comprising:

at a web server, receiving a request for a web page from a client, determining at the web server that the requested web page requires user authentication, in response sending an authentication request web page to the client, where the sent authentication request web page contains redirect information that if received by the client will cause the client to redirect the web page to an authentication agent other than the client or the web server which will respond by directly communicating with the client to authenticate the user where the authentication result is accompanied by a redirect indicator, where the client receives the redirect indicator with the authentication result and in response automatically redirects the authentication result from the client to said content provider via the network, whereby the authentication result issues from the authenticator server and automatically passes through the client to the content provider.

19. A method according to claim 18, where the redirect information further comprises information that allows the authentication agent to identify the web server that sent the authentication request web page.

* * * * *

UNITED STATES PATENT AND TRADEMARK OFFICE
CERTIFICATE OF CORRECTION

PATENT NO. : 6,970,848 B2
APPLICATION NO. : 09/814755
DATED : November 29, 2005
INVENTOR(S) : Yoshimichi Osaka et al.

It is certified that error appears in the above-identified patent and that said Letters Patent is hereby corrected as shown below:

Column 14,
Lines 40, 42 and 63, change "readiest" to -- request --.
Line 45, change "the" (first occurrence) to -- type --.

Column 15,
Line 61, change "readiest" to -- request --.

Column 18,
Line 32, after "based" insert -- on --.

Signed and Sealed this

Twentieth Day of June, 2006

JON W. DUDAS
*Director of the United States Patent and Trademark Office*